United States Patent [19]
Rolph

[11] Patent Number: 5,743,061
[45] Date of Patent: Apr. 28, 1998

[54] WALL ANCHOR

[75] Inventor: Dennis P. Rolph, Charles City, Iowa

[73] Assignee: Diversified Fastening Systems, Inc., Charles City, Iowa

[21] Appl. No.: 746,475

[22] Filed: Nov. 12, 1996

[51] Int. Cl.$^6$ .............................. E04C 5/12; E04B 1/38
[52] U.S. Cl. ................. 52/698; 52/712; 52/745.21; 248/231.91; 405/259.4; 411/25; 411/33; 411/75; 411/400; 411/510
[58] Field of Search ................. 52/698, 712, 713, 52/745.21; 248/231.91; 411/15, 24, 25, 26, 32, 33, 54, 56, 70, 75, 301, 305, 306, 324, 400, 508, 509, 510; 405/259.1, 259.4

[56] References Cited

U.S. PATENT DOCUMENTS

| | | | |
|---|---|---|---|
| 2,878,668 | 3/1959 | Starling et al. | 248/231.91 |
| 3,289,373 | 12/1966 | Miller | 52/698 X |
| 3,350,976 | 11/1967 | Topf | 411/510 X |
| 3,451,304 | 6/1969 | Taylor | 411/75 |
| 3,481,242 | 12/1969 | Topf | 411/510 X |
| 3,737,128 | 6/1973 | Schuplin | 411/510 X |
| 3,828,511 | 8/1974 | Broberg | 52/745.21 |
| 3,959,853 | 6/1976 | Talan | 411/510 X |
| 4,515,669 | 5/1985 | Dimond et al. | 411/75 X |
| 4,609,170 | 9/1986 | Schnabl | 411/508 X |
| 4,625,489 | 12/1986 | Bögle | 52/712 |
| 5,327,696 | 7/1994 | McBride | 52/745.21 |

*Primary Examiner*—Carl D. Friedman
*Assistant Examiner*—Kevin D. Wilkens
*Attorney, Agent, or Firm*—G. Brian Pingel; Brett J. Trout

[57] ABSTRACT

A wall anchor having a first inclined plane secured to a second inclined plane by a connector. The connector is resilient to allow the inclined planes to move relative to one another. The inclined planes are oriented opposite one another, in a manner which increases their combined height as the inclined planes slide in a first direction relative to one another, and which decreases their combined height as the inclined planes slide in a second direction relative to one another. A retainer is secured to the first inclined plane and is used to insert the inclined planes into a hole in a wall. After the inclined planes have been inserted, the retainer is withdrawn slightly, which causes the inclined planes to slide relative to one another and increase their combined height to wedge the inclined planes against an interior surface of the hole. In this manner, a retainer may be securely and manually anchored to a wall.

20 Claims, 5 Drawing Sheets

WALL ANCHOR

BACKGROUND OF THE INVENTION

1. Field of the Invention

The present invention relates in general to a wall anchor for insertion into a hole in a wall and, more particularly, to a manually inserted wall anchor which is secured against removal.

2. Description of the Prior Art

Manually insertable wall anchors are generally known in the art. The general configuration of such wall anchors include a shank, with pivotal members attached thereto. Such a wall anchor is generally taught in U.S. Pat. No. 4,633,640. A general drawback of such prior art wall anchors is the minimal surface contact between the wedge members and the shank. To allow the wedge members to pivot relative to the shank, the connection point between the shank and the wedge members must necessarily be very narrow. Due to the narrowness of this connection, not only are the wedge members more likely to become inadvertently dislocated from the shaft before insertion, large amounts of outward force on the shaft after the device has been inserted into the wall could also dislocate the wedge members from the shaft.

Another drawback of such prior art devices is the centering of the shaft between the wedge members. Because the shaft itself is not braced against an interior wall of the hole, vertical stresses on the shaft from outside the hole cause a large amount of stress on the first wedge members connected to the shaft. Over time, such stresses could deform such wedge members to the point that they are no longer useful in maintaining the shaft within the hole. The difficulties encountered in the prior art discussed hereinabove are substantially eliminated by the present invention.

SUMMARY OF THE INVENTION

The present invention provides a wall anchor for insertion into a hole in a wall. The invention includes a first inclined plane having an exterior surface, an interior surface, a low end and a high end. The wall anchor also includes a second inclined plane having an exterior surface, an interior surface, a low end and a high end. Means are provided for orienting the low end of the first inclined plane toward the high end of the second inclined plane, and for orienting the high end of the first inclined plane toward the low end of the second inclined plane. A retainer is secured to the first inclined plane.

In the preferred embodiment, the orienting means is a resilient connector secured between the first inclined plane and the second inclined plane. The inclined planes are also provided with fins which increase frictional characteristics of the inclined planes to reduce slippage against the interior surfaces of a hole. As the wall anchor is inserted into a hole, the inclined planes slide relative to one another to decrease the longitudinal cross-sectional dimension of the wall anchor. Conversely, when the wall anchor is pulled outward, the inclined planes slide relative to one another to increase the combined longitudinal dimension of the inclined planes.

In this manner, the inclined planes push one another outward against the interior surface of the hole, thereby wedging the wall anchor securely within the hole. Additionally, because the retainer is secured to one of the inclined planes, rather than centered within the hole, the interior wall of the hole acts as further support of the retainer to reduce undue leverage and stress on the portion of the inclined plane nearest the mouth of the hole.

DETAILED DESCRIPTION OF THE PREFERRED EMBODIMENT

Figure 1:
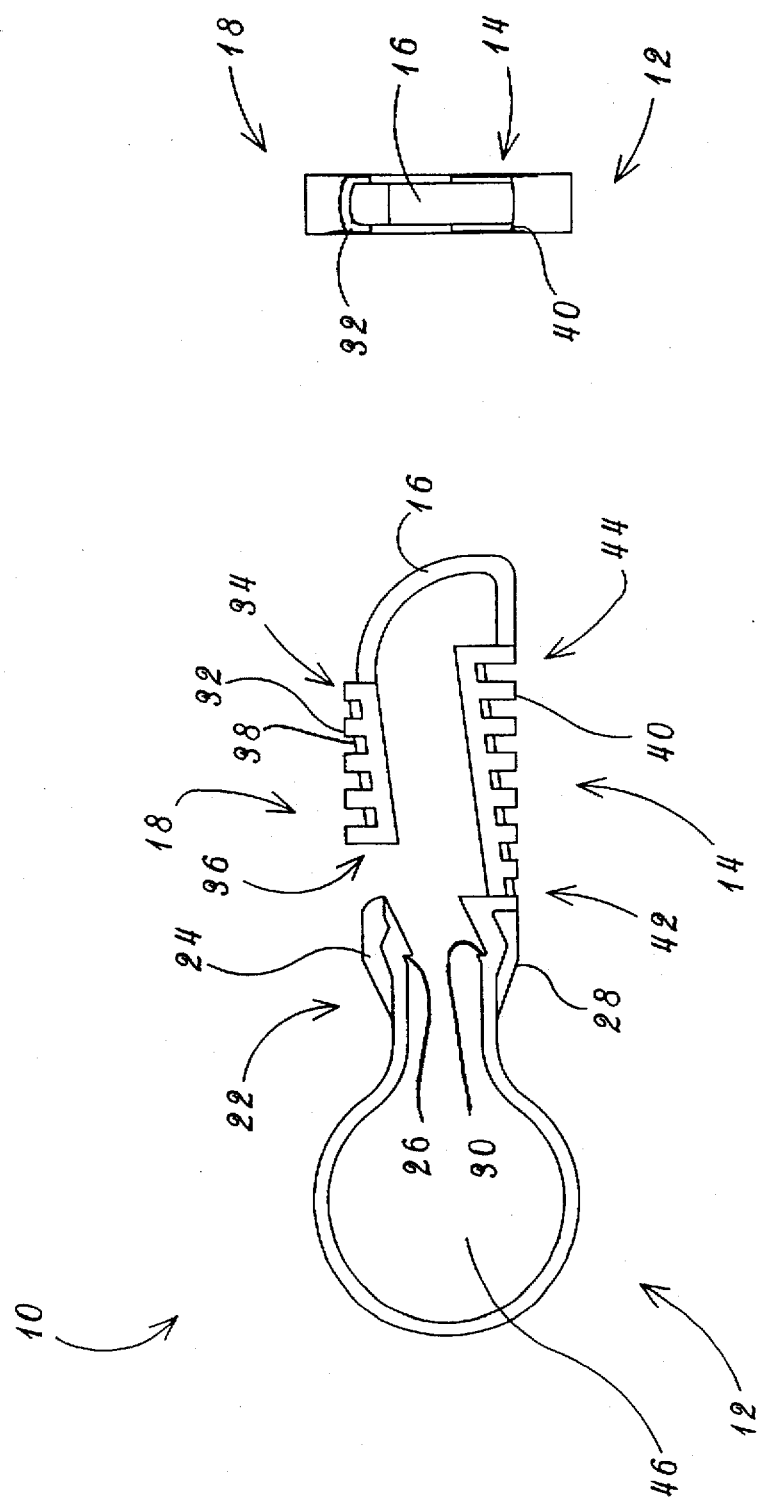
FIG. 1 is a side elevation of the wall anchor of the present invention.

With reference to the drawings, the wall anchor of the present invention is indicated generally as 10 in FIG. 1. The wall anchor 10 includes a retainer 12, a large inclined plane 14, a resilient connector 16 and a small inclined plane 18. Although the wall anchor 10 may be constructed of any suitable material, in the preferred embodiment, the wall anchor 10 is injection molded into a single piece of polypropylene.

Figure 2:
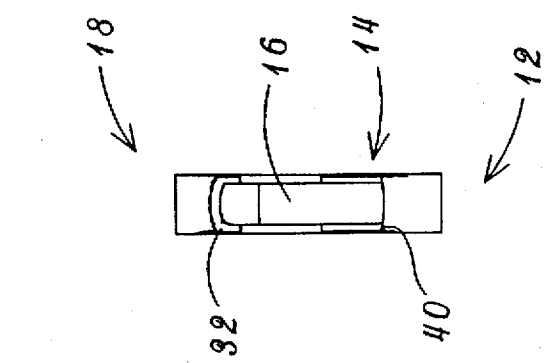
FIG. 2 is a rear elevation of the wall anchor of FIG. 1.

The retainer 12 is provided with a free-end 22 to which is secured a first catch 24 having a first barb 26. The retainer 12 is also provided with a second catch 28 having a second barb 30. The first barb 26 is configured for mating alignment with the second barb 30. As shown in FIG. 2, the retainer 12 is preferably configured into a flat band to avoid impinging material held within the retainer 12.

As shown in FIG. 1, the small inclined plane 18 is provided with a plurality of arcuate fins 32. As shown in FIG. 2, the fins 32 increase in height as they move from a low end 34 of the small inclined plane 18 toward a high end 36. Also as shown in FIG. 1, the wall anchor 10 is provided with a rib 38 which interconnects all of the fins 32 of the small inclined plane 18 to give the fins 32 strength. In a similar manner, the large inclined plane 14 is provided with a plurality of arcuate fins 40 increasing in height from a low end 42 of the large inclined plane 14 to a high end 44.

For securement within a one centimeter diameter hole, the preferred dimensions of the wall anchor 10 are, five millimeters for the height of the high end 36 of the small inclined plane 18, with a six degree incline toward the low end 34. The high end 44 of the large inclined plane 14 is seven and eight tenths millimeters high. The high end 44 of the large inclined plane 14 declines at a six degree angle downward toward the low end 42 of the large inclined plane 14, which is five and one tenth millimeters high. Both inclined planes 14 and 18 are seven and eighty-eight hundredths millimeters wide. Additionally, the curvature of the arcuate fins 32 and 40 are based upon a curve having a radius of five millimeters to match the curvature of a hole 48 into which the wall anchor 10 is placed. The small inclined plane 18 is eighteen millimeters long and the large inclined plane is thirty-two millimeters long.

For the retainer, the combined height of the first catch 24 and second catch 28, when the catches 24 and 28 are moved into mating alignment is ten millimeters. The retainer 12 is provided along a circle having a radius of ten millimeters. The retainer 12 is seven and eighty-eight hundredths millimeters wide and is fifty-eight and twenty-four hundredths millimeters long when configured as shown in FIG. 1.

Figure 3:
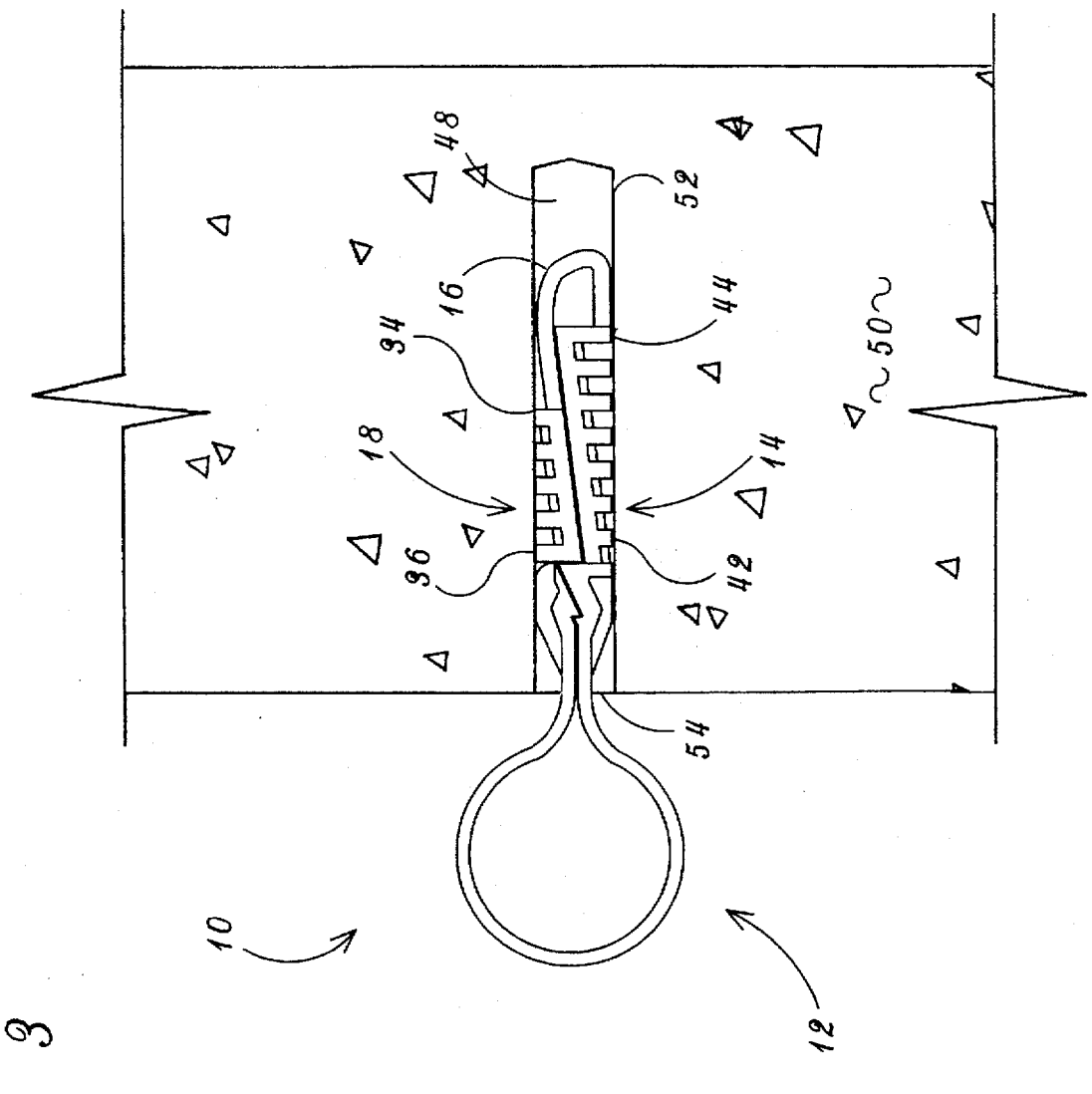
FIG. 3 is a side elevation of the wall anchor of FIG. 1 shown being inserted into a hole.

To use the wall anchor 10 of the present invention, the first catch 24 is moved into mating alignment with the second catch 28 and the high end 36 of the small inclined plane 18 is moved toward the low end 42 of the large inclined plane 14. The wall anchor 10 is then inserted into the hole 48 provided in a wall 50 (FIG. 3). As shown in FIG. 3, as the wall anchor 10 is moved further into the hole 48, the interior surface 52 of the hole 48 contacts the fins 32 of the small inclined plane 18. The interior surface 52 of the hole 48 forces the high end 36 of the small inclined plane 18 toward the low end 42 of the large inclined plane 14 against the bias of the resilient connector 16.

Figure 4:
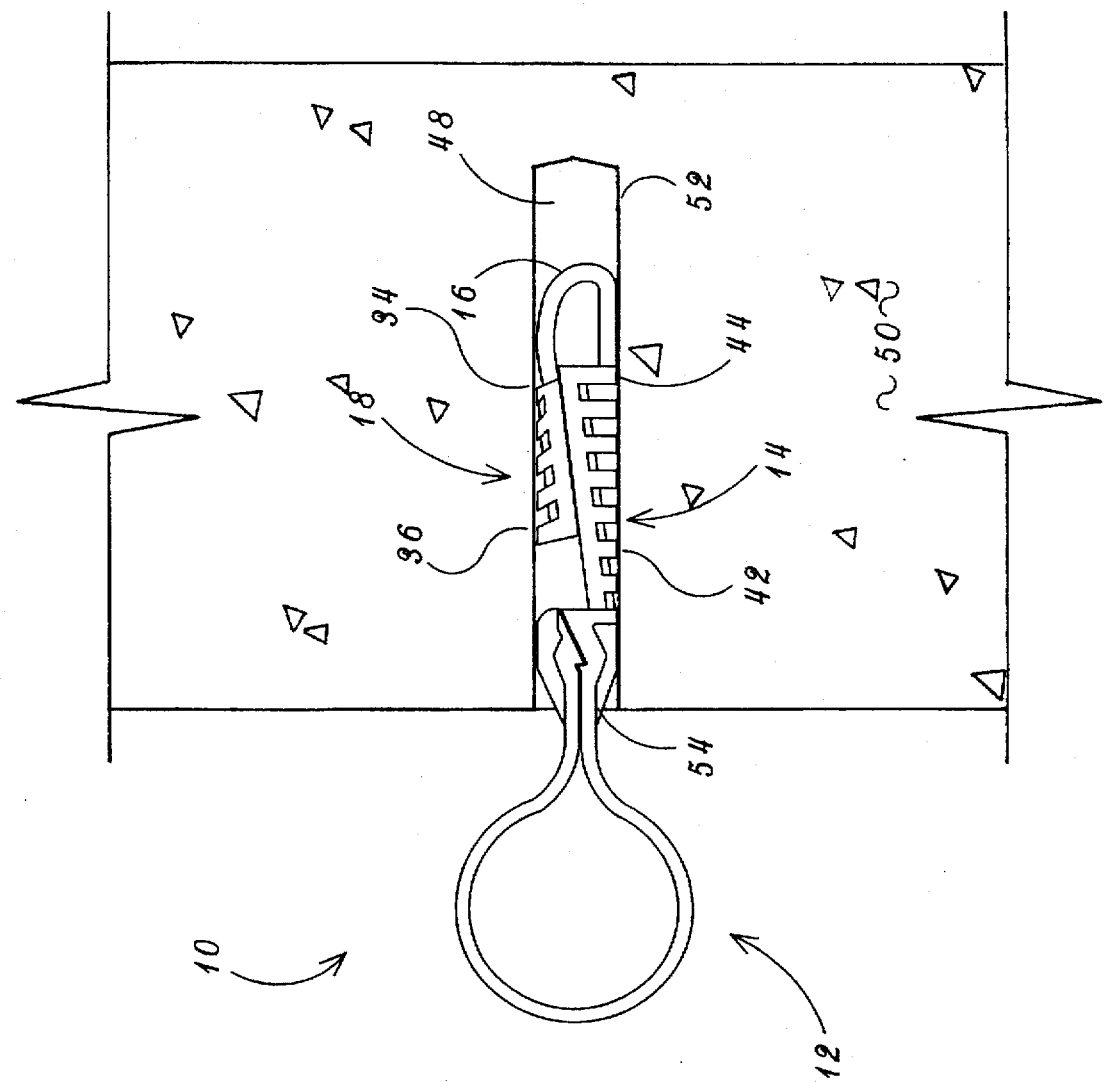
FIG. 4 is a side elevation of the wall anchor of FIG. 1 being withdrawn from the hole.

The wall anchor 10 is preferably inserted into the hole 48 beyond the point at which it is desired to retain the wall anchor 10 within the hole 48. The wall anchor 10 is then pulled slightly out of the hole 48. This action causes the fins 32 of the small inclined plane 18 engage the interior surface 52 of the hole, thereby preventing movement of the small inclined plane 18 relative to the interior surface 52. As the retainer 12 pulls the large inclined plane 14 toward a mouth 54 of the hole 48, the high end 44 of the large inclined plane 14 moves toward the high end 36 of the small inclined plane 18. This action causes the combined cross-sectional height of the large inclined plane 14 and small inclined plane 18 to increase, which forces the fins 32 and 40 tightly into contact with the interior surface 52 of the hole 48. The further the retainer 12 is withdrawn, the more tightly the inclined planes 14 and 18 wedge into the hole 48. Additionally, as shown in FIG. 4, given the tight tolerance between the catches 24 and 28 and the interior surface 52 of the hole 48, there is insufficient room for the catches 24 and 28 to become disengaged from one another. Accordingly, the interior surface 52 of the hole 48 also prevents the retainer 12 from opening.

Figure 5:
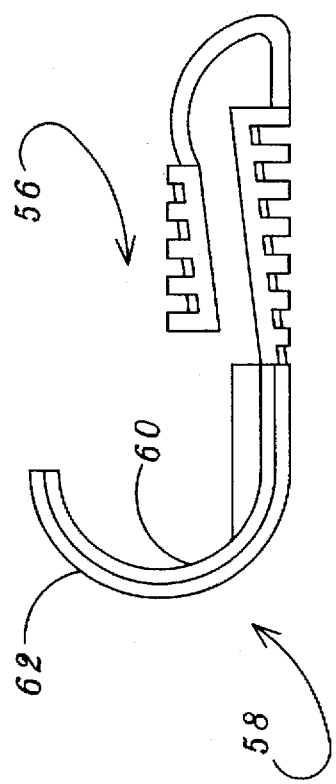
FIG. 5 is a side elevation of an alternative J-hook embodiment of the present invention.
Figure 6:
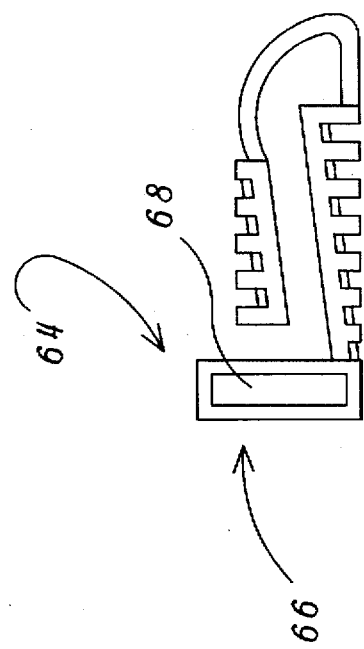
FIG. 6 is a side elevation of an alternative tie-wrap embodiment of the present invention.

FIG. 5 shows an alternative embodiment wall anchor 56 provided with a J-hook 58. The J-hook 58 is provided with a curved face 60, seven and eighty-eight hundredths millimeters wide and one and twenty-five hundredths millimeters high. Secured to the curved face 60 is a spine 62 which is two millimeters wide and one and twenty-five hundredths millimeters high. A tie-wrap alternative embodiment of the present invention is shown generally as 64 in FIG. 6. Instead of a retainer 12, as shown in the preferred embodiment, this alternative embodiment 64 is provided with a tie-wrap retainer 66. The tie-wrap retainer 66 is nineteen and thirty-two hundredths millimeters wide and thirteen and two tenths millimeters high. Passing through the center of the tie-wrap retainer 66 is a slot 68. The slot 68 is two and eighty-eight hundredths millimeters long and nine and two tenths millimeters high. This alternative embodiment 64 may be used to secure tie-wraps (not shown) through the slot 68 to hold cables (not shown) or the like.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. For example, it is anticipated that any type of retainer may be used or that any dimensions for the wall anchor may be provided to accommodate various size apertures.

What is claimed is:

1. A one-piece wall anchor comprising:
   (a) a first inclined plane having an exterior surface having an arcuate cross-section, a substantially flat interior surface, a low end and a high end;
   (b) a second inclined plane having an exterior surface having an arcuate cross-section, a substantially flat interior surface, a low end and a high end;
   (c) resilient means integrally molded between said first inclined plane and said second inclined plane for orienting said low end of said first inclined plane toward said high end of said second inclined plane and for orienting said high end of said first inclined plane toward said low end of said second inclined plane;
   (d) a retainer secured to said first inclined plane and having a first end and a second end; and
   (e) means for securing said first end of said retainer to said second end of said retainer.

2. The wall anchor of claim 1, further comprising means provided on said exterior surface of said first inclined plane for increasing frictional characteristics of said exterior surface of said first inclined plane.

3. The wall anchor of claim 2 wherein said friction increasing means provided on said exterior surface of said first inclined plane is a plurality of fins.

4. The wall anchor of claim 3, further comprising means provided on said exterior surface of said second inclined plane for increasing frictional characteristics of said exterior surface of said second inclined plane.

5. The wall anchor of claim 4, wherein said friction increasing means provided on said exterior surface of said second inclined plane is a plurality of fins.

6. A substrate provided with a cavity and having an anchor imbedded within the cavity comprising:
   (a) a substrate provided with a cavity;
   (b) an anchor comprising;
      (i) a first inclined plane having an exterior surface, an interior surface, a low end and a high end;
      (ii) a second inclined plane having an exterior surface, an interior surface, a low end and a high end;
      (iii) means for orienting said low end of said first inclined plane towards said high end of said second inclined plane and for orienting said high end of said first inclined plane towards said low end of said second inclined plane;
      (iv) wherein said high end of said first inclined plane and said high end of said second inclined plane are sufficiently large to prevent said second inclined plane from sliding past said first inclined plane when the anchor is secured within the cavity of the substrate;
      (v) a retainer secured to said first inclined plane; and
   (c) wherein the anchor is secured within the cavity of the substrate.

7. The substrate and imbedded anchor of claim 1, further comprising means provided on said exterior surface of said first inclined plane for increasing frictional characteristics of said exterior surface of said first inclined plane.

8. The substrate and imbedded anchor of claim 7, wherein said friction increasing means provided on said exterior surface of said first inclined plane has greater frictional characteristics than said interior surface of said first inclined plane.

9. The substrate and imbedded anchor of claim 8, further comprising means provided on said exterior surface of said second inclined plane for increasing frictional characteristics of said exterior surface of said second inclined plane.

10. The substrate and imbedded anchor of claim 9, wherein said friction increasing means provided on said exterior surface of said second inclined plane is a plurality of fins.

11. The substrate and imbedded anchor of claim 8, wherein said friction increasing means provided on said exterior surface of said first inclined plane is a plurality of fins.

12. The substrate and embedded anchor of claim 11, further comprising means provided on said exterior surface of said second inclined plane for increasing frictional characteristics of said exterior surface of said second inclined plane.

13. The substrate and imbedded anchor of claim 6, wherein said orienting means is, a resilient connector secured between said high end of said first inclined plane and said low end of said second inclined plane.

14. The substrate and imbedded anchor of claim 13, wherein said first inclined plane, said second inclined plane, said retainer and said resilient connector are all integrally molded into a one-piece construction.

15. The substrate and imbedded anchor of claim 6, wherein said retainer is provided with a first end and a second end, and further comprising means for securing said first end of said retainer to said second end of said retainer.

16. The substrate and imbedded anchor of claim 15, wherein said securing means comprises:

(a) a first catch secured to said first end of said retainer; and (b) a second catch secured to said second end of said retainer and configured for mating alignment with said first end of said retainer.

17. The substrate and imbedded anchor of claim 6, wherein said exterior surface of said first inclined plane is provided with at least a partially arcuate cross-section.

18. The substrate and imbedded anchor of claim 17, wherein said interior surface is substantially flat.

19. A method for securing a retainer to a wall comprising:

(a) providing a wall having a hole, wherein said hole is provided with an interior surface and a mouth;

(b) providing a wall anchor comprising:

(i) a first inclined plane having an exterior surface, an interior surface, a low end and a high end;

(ii) a second inclined plane having an exterior surface, an interior surface, a low end and a high end;

(iii) means for orienting said low end of said first inclined plane toward said high end of said second inclined plane and for orienting said high end of said first inclined plane toward said low end of said second inclined plane;

(iv) wherein a height of said high end of said first inclined plane combined with a height of said high end of said second inclined plane is greater than a width of said hole, wherein a height of said low end of said first inclined plane is less than a width of said hole, and wherein a height of said low end of said second inclined plane is less than a width of said hole; and (v) a retainer secured to said first inclined plane;

(c) inserting said orienting means, said first inclined plane and said second inclined plane into said hole; and (d) pulling said first inclined plane toward said mouth of said hole until said interior surface of said first inclined plane slides across the interior surface of said second inclined plane a sufficient distance to wedge said exterior surface of said first inclined plane and said exterior surface of said second inclined plane against said interior surface of said hole.

20. The method of claim 19, further comprising fins provided on said exterior surface of said first inclined plane and said exterior surface of said second inclined plane.

* * * * *